US006556554B1

(12) United States Patent
Yun et al.

(10) Patent No.: US 6,556,554 B1
(45) Date of Patent: Apr. 29, 2003

(54) DEVICE AND METHOD FOR COMMUNICATING POWER CONTROL SIGNALS IN MOBILE COMMUNICATION SYSTEM

(75) Inventors: Yu-Suk Yun, Seoul (KR); Young-Ky Kim, Seoul (KR); Soon-Young Yoon, Seoul (KR); Jae-Min Ahn, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/336,252

(22) Filed: Jun. 18, 1999

(30) Foreign Application Priority Data

Jun. 18, 1998 (KR) ............................................. 98-22915

(51) Int. Cl.$^7$ ............................................. H04B 7/216
(52) U.S. Cl. ...................... 370/335; 370/342; 370/320; 370/332
(58) Field of Search ................................ 370/318, 320, 370/332, 335, 342, 331, 321, 334, 341; 455/522, 572, 69, 68

(56) References Cited

U.S. PATENT DOCUMENTS

| 6,088,324 A | * | 7/2000 | Sato ........................... 370/203 |
| 6,097,972 A | * | 8/2000 | Saints et al. ................ 455/572 |
| 6,185,266 B1 | * | 2/2001 | Kuchi et al. ................ 375/347 |
| 6,212,364 B1 | * | 4/2001 | Park ............................ 455/69 |
| 6,249,683 B1 | * | 6/2001 | Lundby et al. ............. 455/522 |

* cited by examiner

Primary Examiner—Vivian Chin
Assistant Examiner—John J Lee
(74) Attorney, Agent, or Firm—Dilworth & Barrese, LLP

(57) ABSTRACT

A power control device for a mobile communication system includes a base station transmitter and a mobile station receiver, wherein the base station transmitter includes: a plurality of PCB pattern generators for multiplying PCBs for a plurality of mobile stations by user patterns assigned to the respective mobile stations, to generate PCB patterns for the respective mobile stations, wherein the user patterns are orthogonal with one another; an adder for adding up the PCB patterns from the plural PCB pattern generators to generate a power control signal; and a transmitter for modulating the power control signal received from the adder and transmitting the modulated power control signal, wherein the mobile station receiver includes: a power control signal extractor for extracting the power control signal within a given interval of a reception signal received on a single code channel, wherein PCB patterns for a plurality of mobile stations are added to the power control signal; a PCB pattern generator for multiplying the power control signal by the user pattern assigned to the mobile station itself, to extract the PCB pattern of the mobile station; and a decider for generating PCBs in accordance with a signal level of the extracted PCB pattern.

23 Claims, 2 Drawing Sheets

DEVICE AND METHOD FOR COMMUNICATING POWER CONTROL SIGNALS IN MOBILE COMMUNICATION SYSTEM

BACKGROUND OF THE INVENTION

1. Field of the Invention

The present invention relates generally to a mobile communication system and, more particularly, to a device and method for communicating power control signals within a given interval on a single code channel, to separately control the transmission power of multiple mobile stations.

2. Description of the Related Art

It is generally known that in order to transmit power control bits (PCBs) for a plurality of mobile stations on a single forward link code channel, a base station assigns time slots to the individual mobile stations and sends the PCBs for the mobile stations at the corresponding time slots. That is, in the case where the base station transmits PCBs for a plurality of mobile stations on the forward link, the base station assigns a plurality of specific time slots to the respective mobile stations without exception, which results in a waste of time slot resources when some of transmission code channels of mobile station are not in use.

SUMMARY OF THE INVENTION

It is, therefore, an object of the present invention to provide a device and method for communicating power control signals on a single code channel in a mobile communication system, wherein the power control signals can be used to separately control transmission power for a plurality of mobile stations.

It is another object of the present invention to provide a transmission device and method for a base station, which transmits power control signals within a given interval of a transmission signal on a single code channel in a mobile communication system, wherein PCB patterns for a plurality of mobile stations are added to the power control signals.

It is a further object of the present invention to provide a receiving device and method for a mobile station in a mobile communication system, which extracts power control signals within a given interval of a reception signal on a single code channel and multiplies the extracted power control signal by a user pattern assigned to the receiving device to decide a PCB directed to the receiving device.

To achieve the above object of the present invention, there is provided a power control device and an associated method for a mobile communication system including a base station transmitter and a mobile station receiver, wherein the base station transmitter includes: a plurality of PCB pattern generators for multiplying PCBs for a plurality of mobile stations by user patterns assigned to the respective mobile stations, to generate PCB patterns for the respective mobile stations, wherein the user patterns are orthogonal with one another; an adder for adding up the PCB patterns from the plural PCB pattern generators to generate a power control signal; and a transmitter for modulating the power control signal received from the adder and transmitting the modulated power control signal, wherein the mobile station receiver includes: a power control signal extractor for extracting the power control signal within a given time interval of a reception signal received on a single code channel, wherein PCB patterns for a plurality of mobile stations are included in the power control signal; a PCB pattern generator for multiplying the power control signal by the user pattern assigned to the mobile station itself, to extract the PCB pattern of the mobile station; and a decider for generating PCBs in accordance with a signal level of the extracted PCB pattern.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

Figure 1:
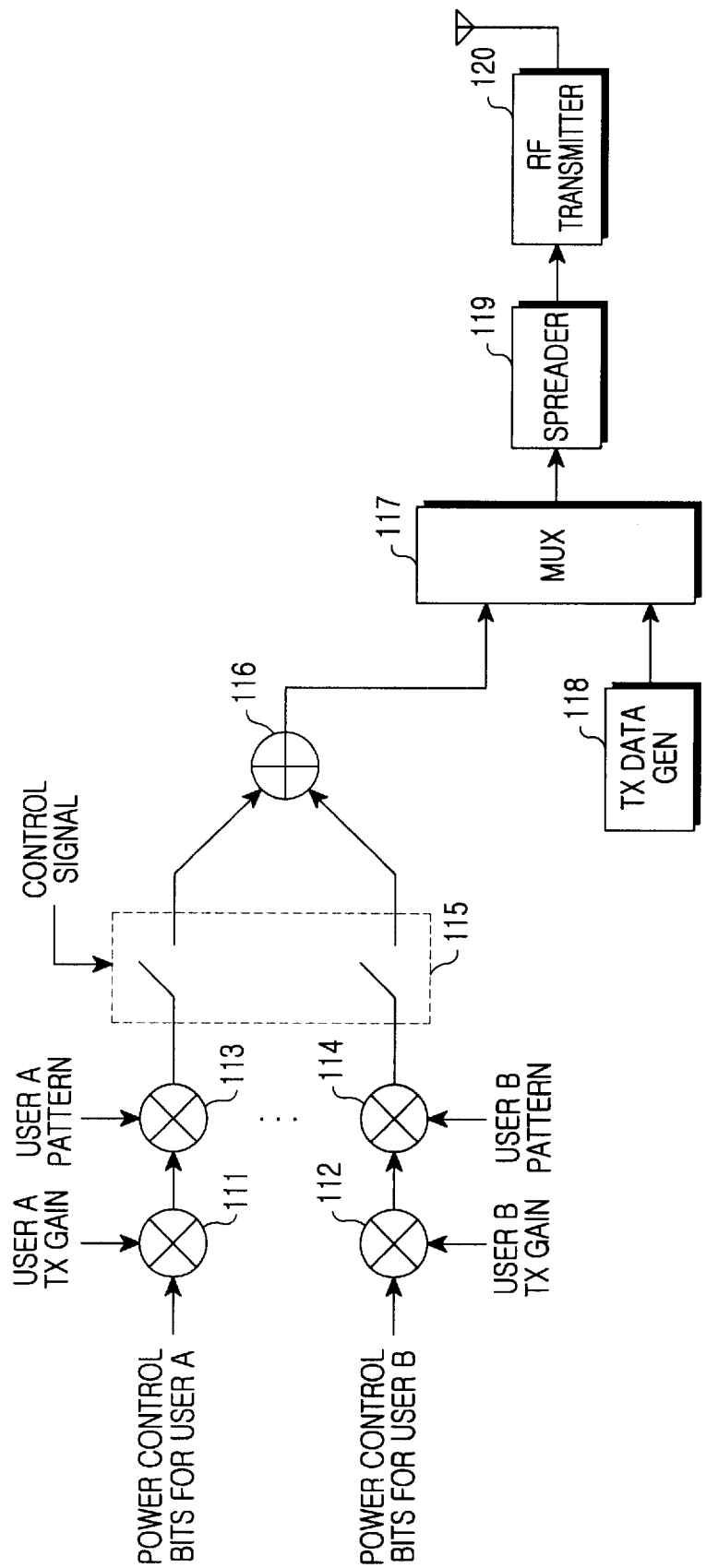
FIG. 1 is a block diagram illustrating a base station transmitter for use in a mobile communication system according to an embodiment of the present invention.

FIG. 1 illustrates a base station transmitter for transmitting power control signals within a given interval of a transmission signal on a single code channel in a mobile communication system, wherein PCB patterns for a plurality of mobile stations are multiplexed with the power control signals, according to an embodiment of the present invention.

Referring to FIG. 1, a transmission data generator 118 includes a channel encoder and an interleaver (not shown), for encoding transmission data as a frame unit to generate symbol data.

A multiplier 111 multiplies a PCB (+1 or −1) for a user A by a transmission gain to generate a gain controlled PCB for the user A. A multiplier 112 multiplies a PCB for a user B by a transmission gain to generate a gain controlled PCB for the user B. A multiplier 113 multiplies the gain controlled PCB from the multiplier 111 by a pattern for the user A to generate a PCB pattern for the user A. A multiplier 114 multiplies the gain-controlled PCB from the multiplier 112 by a pattern for the user B to generate a PCB pattern for the user B. Here, the PCB patterns for the user A and user B are orthogonal with each other, because the corresponding patterns for user's A and B are orthogonal.

Although the present embodiment illustrates PCBs for two users, it will be understood by those skilled in the art that the invention is not limited to two users. To support additional users, the method of the present invention would simply employ additional PCBs and user pattern bits, corresponding to the number of additional users.

A selector 115 selects the PCBs to be transmitted in accordance with a control signal and outputs them to an adder 116. The adder 116 adds the PCBs received from the selector 115 to generate a power control signal.

A multiplexer 117 multiplexes outputs of the transmission data generator 118 and the adder 116. In a CDMA 2000 system, the multiplexer 117 inserts the power control signal at a particular position of the transmission data after puncturing; in a UMTS (Universal Mobile Telecommunication System), the multiplexer 117 multiplexes the transmission data and the power control signal.

A spectrum spreader 119 spreads an output of the multiplexer 117, for example, by orthogonal code spreading or PN code spreading. An RF (Radio Frequency) transmitter 120 modulates the spread signal from the spreader 119 into an RF signal and transmits the modulated RF signal via a transmit antenna.

Now, reference will be made to the procedures at the base station for transmitting the power control signals, with PCB patterns for a plurality of users added thereto, within a given interval of a signal to be transmitted on a single code channel, in connection with FIG. 1.

First, it is assumed that: (1) a pattern for the user A is (+1,+1) and a pattern for the user B is (+1,−1); (2) the PCB for the user A is (+1,+1), (i.e., a power-up signal) and the PCB for the user B is (−1,−1), (i.e., a power-down signal); and (3) the multipliers 111 and 112 multiply the respective PCBs by a gain of 1.

For the example above, the PCB pattern for user A output through the multipliers 111 and 113 is (+1,+1) and the PCB pattern for the user B output through the multipliers 112 and 114 is (−1,+1). These PCB patterns are selected by the selector 115 and output to the adder 116. Then, the adder 116 adds the PCB patterns generated from the multipliers 112 and 114 to generate a power control signal (0,+2) that would be finally transmitted. The multiplexer 117 multiplexes the power control signal (0,+2) output from the adder 116 to the transmission data from the transmission data generator 118 and outputs the multiplexed power control signal to the spreader 119. Then, the spreader 119 spreads the multiplexed power control signal by orthogonal code spreading or PN code spreading. The RF transmitter 120 converts the spread baseband signal to an RF signal and transmits the RF signal via a transmit antenna.

The PCB patterns generated in accordance with the user patterns are shown in Table 1.

TABLE 1

| User Pattern | PCB | PCB Pattern According to User Pattern |
|---|---|---|
| User A (00) | "+1+1" (Increase in Tx Power of Mobile Station) | +1+1 |
| User B (01) | "+1+1" (Increase in Tx Power of Mobile Station) | +1−1 |
| User A (00) | "−1−1" (Decrease in Tx Power of Mobile Station) | −1−1 |
| User B (01) | "−1−1" (Decrease in Tx Power of Mobile Station) | −1+1 |

Figure 2:
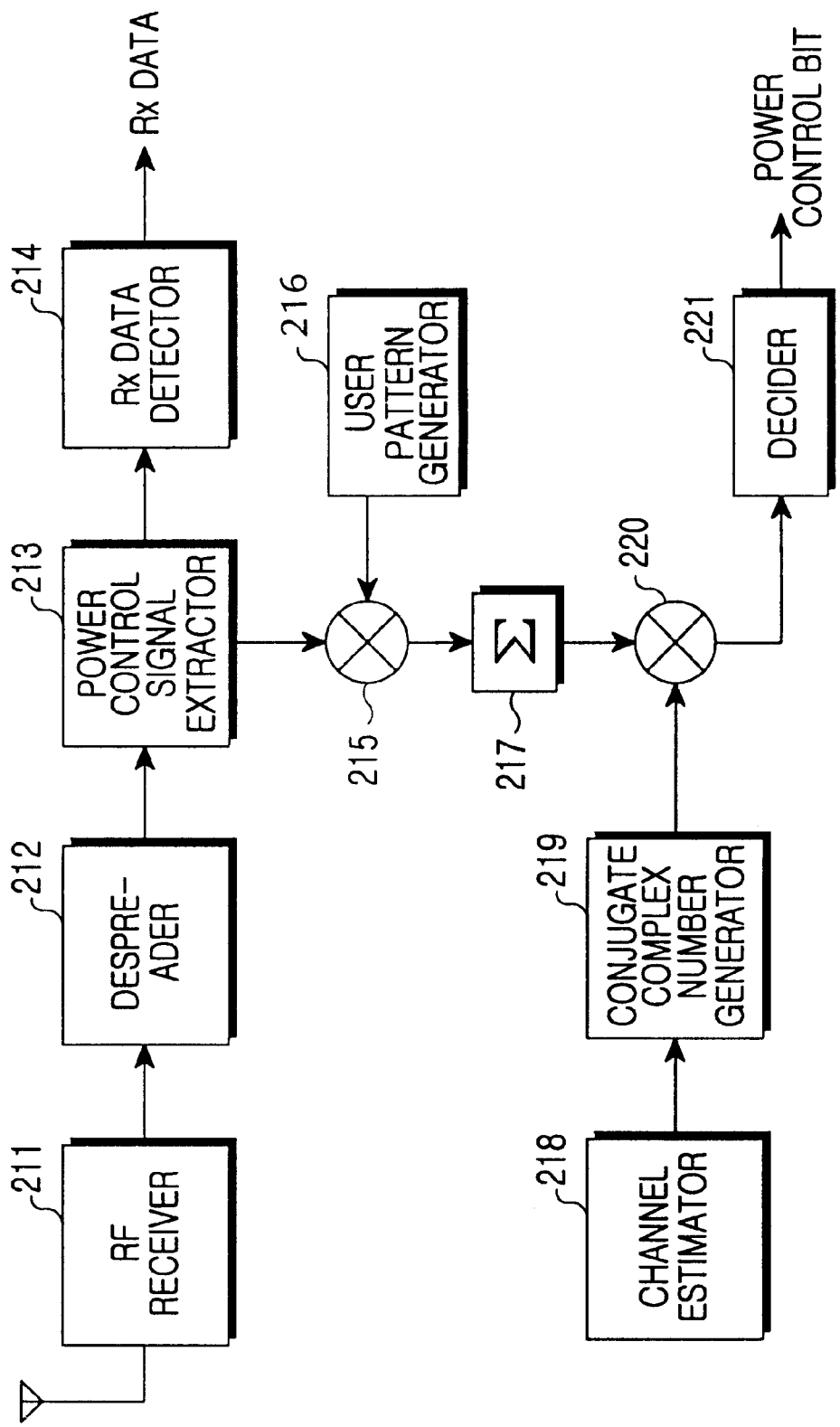
FIG. 2 is a block diagram illustrating a mobile station receiver for use in a mobile communication system according to an embodiment of the present invention.

Referring to FIG. 2, a description will be provided for a mobile station receiver which determines the specific PCBs directed to itself by extracting a power control signal within a particular interval of a reception signal from the base station and multiplying the extracted power control signal by a unique user pattern specific to the mobile station (See Col. 1 of Table 1).

First, an RF receiver 211 converts an RF signal, received from the base station via an antenna, to a baseband signal. A spectrum despreader 212 performs complex PN despreading or orthogonal code despreading for the baseband signal. A power control signal extractor 213 extracts a power control signal from the output signal of the despreader 212. The power control signal extractor 213 outputs the extracted power control signal to a multiplier 215 and also to a reception data detector 214.

A user pattern generator 216 generates a user pattern assigned to the mobile station through prior negotiations with the base station. The multiplier 215 multiplies the extracted power control signal by the user pattern generated from the user pattern generator 216 to generate a PCB pattern as input to an integrator. An integrator 217 integrates the output of the multiplier 215.

A channel estimator 218 estimates a channel being currently used and outputs a complex signal. A conjugate complex number generator 219 conjugates the outputs of the channel estimator 218 to generate a conjugate signal. A multiplier 220 multiplies an output signal of the integrator 217 by an output signal of the conjugate complex number generator 219 so as to compensate for signal distortion.

A decider 221 decides power control commands by comparing the output signal level of the multiplier 220 with a predetermined threshold and provides the result to a system controller (not shown). Thereafter, the system controller controls transmission power of the mobile station in accordance with the power control commands.

Referring now to FIG. 2, a more detailed description will be provided regarding the operation of the mobile station for extracting a power control signal within a given interval of the reception signal and multiplying the extracted power control signal by the unique user pattern so as to decide PCBs for itself.

It is assumed herein that: (1) the base station assigns a particular user pattern for the mobile station associated with user A, (e.g., 00 (+1,+1)). The base station then sends a power-up PCB (+1,+1) to the mobile station; and (2) the base station assigns a user pattern for user B, (e.g., (+1,−1)). The base station then sends a power-down PCB (−1,−1) to the mobile station associated with user B. For the present example, the base station adds up the PCB patterns for the two users A and B (+1,+1) and (−1,−1), respectively, and sends a power control signal (0,+2) to the mobile station.

The RF receiver 211 then converts an RF signal, received via the antenna, to a baseband signal. The spectrum despreader 212 performs a complex PN despreading or an orthogonal code despreading on the baseband signal, and the power control signal extractor 213 extracts a power control signal from the output signal of the despreader 212. The power control signal extractor 213 outputs an extracted power control signal to the multiplier 215 and also, to the reception data detector 214.

The method for determining the transmission power of a mobile station based on the extracted power control signal is as follows. First, under ideal channel conditions, the input signal of the multiplier 215 is (0,+2). That is, the multiplier 215 multiplies the output signal (0,+2) of the power control signal extractor 213 by the output (+1,+1) of the user pattern generator 216 to generate a signal (0,+2). This signal is integrated at the integrator 217 to produce a value of +2. Here, it can be seen from the positive symbol of the signal that the base station sent a power-up command. However, transmission signals in a radio system may be accompanied by delays or magnitude and phase distortions associated with poor channel conditions that disable successful reception of the signal at the reception party. When this occurs, the reception party (i.e., mobile station) must estimate the current channel state from the received signal and store the estimated values for the current channel state to accurately demodulation of the received signal into the original transmission signal.

That is, the value of +2 calculated at the integrator 217 is not an actual value but a theoretical one obtained under the assumption that the channel conditions are ideal. In order to accurately decide the power control command transmitted, there is a need to compensate for the distorted value. Compensation for the distorted value is performed at the multiplier 220. That is, after estimation of the current channel state, the channel estimator 218 measures the magnitude and phase distortions of the received signal. The conjugate complex number generator 219 conjugates the output signal of the channel estimator 218 to generate a conjugate signal for compensation of the channel. Then, the multiplier 220 multiplies the output signal of the integrator 217 by the output signal of the conjugate complex number generator 220 to generate a signal compensated for magnitude and phase distortions. Then, the decider 221 decides the PCB from the PCB pattern compensated for channel distortion and provides the decision result for the system controller. Thereafter, the system controller controls transmission power of the mobile station based on the information provided by the decider 221.

In summary, as previously described above, in order to simultaneously control the transmission power for a plurality of mobile stations in a mobile communication system, the base station simultaneously transmits power control bits, to control the transmission power for each mobile stations. The power control bits are multiplied by user patterns which is orthogonal with each other then form a power control signal and transmitted within a particular time interval of a single code channel. Upon receiving the power control signal, the individual mobile station decides the power control command for itself by multiplying the power control signals extracted within the particular interval by its unique user pattern which is orthogonal with the user patterns of the other mobile stations. As a consequence, the present invention discloses an effective method for controlling the transmission power for a plurality of mobile stations at the base station to cope with two situations: first, where the totality of plural mobile stations transmit code channels to the base station either simultaneously or differently in time; and second, where the mobile stations transmit some of the code channels simultaneously and the others differently in time.

Although the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station transmitter comprising:
    a plurality of power control bit (PCB) pattern generators for generating PCBs to control the power of a plurality of mobile stations, said generated PCBs being multiplied by orthogonal user patterns assigned to the respective mobile stations, to generate PCB patterns for the respective mobile stations;
    an adder for adding up the PCB patterns to generate a power control signal; and
    a multiplexer for multiplexing the power control signal with a transmission data to form a combined signal; and
    a transmitter for spreading the combined signal and transmitting the combined signal.

2. The base station transmitter as claimed in claim 1, wherein said multiplexer is implemented by a puncturer/inserter provided between the adder and the transmitter, for inserting the power control signal at a particular position of the transmission data.

3. The base station transmitter as claimed in claim 1, wherein said multiplexer multiplexes the power control signal and the transmission data.

4. The base station transmitter as claimed in claim 1, wherein the PCB pattern corresponds to the user pattern.

5. The base station transmitter as claimed in claim 1, wherein the user patterns are orthogonal with one another.

6. The base station transmitter as claimed in claim 3, wherein a user pattern is assigned to a mobile station in a prior negotiation.

7. A mobile station receiver comprising:
    a power control signal extractor for extracting a power control signal within a given interval of a reception signal received on a code channel, wherein the power-control signal includes PCB patterns for a plurality of mobile stations;
    a PCB pattern generator for multiplying the extracted power control signal by a user pattern assigned to the mobile station, to extract the PCB pattern of the mobile station; and
    a decider for determining a PCB in accordance with a signal level of the extracted PCB pattern.

8. The mobile station receiver as claimed in claim 7, further comprising a distortion compensator provided between the PCB pattern generator and the decider, for multiplying the extracted PCB pattern by a conjugate signal derived from a channel estimator to generate a distortion compensated PCB pattern.

9. The mobile station receiver as claimed in claim 7, wherein the PCB pattern corresponds to the user pattern.

10. The mobile station receiver as claimed in claim 7, wherein the user patterns are orthogonal.

11. The mobile station receiver as claimed in claim 9, wherein a user pattern is assigned to a mobile station in a prior negotiation.

12. A power control device for a mobile communication system, comprising:
    a base station transmitter and a mobile station receiver, wherein the base station transmitter comprises:
        a plurality of PCB pattern generators for generating PCBs to control the power of a plurality of mobile stations, said generated PCBs being multiplied by orthogonal user patterns to generate PCB patterns for the respective mobile stations;
        an adder for adding the generated PCB patterns;
        a multiplexer for multiplexing the power control signals with transmission data to form a combined signal; and
        a transmitter for modulating the combined signal and transmitting the combined signal,
    wherein the mobile station receiver comprises:
        a power control signal extractor for extracting the power control signal within a given interval of a reception signal received on a code channel;
        a PCB pattern generator for multiplying the power control signal by the user pattern assigned to the mobile station, to extract a PCB pattern of the mobile station; and
        a decider for determining PCBs in accordance with a signal level of the extracted PCB pattern.

13. A transmission method for a base station, comprising the steps of:
    (a) multiplying PCBs corresponding to each of a plurality of mobile stations by orthogonal user patterns assigned to the respective mobile stations, to generate PCB patterns for the respective mobile stations;
    (b) adding the generated PCB patterns to generate a power control signal;
    (c) mulitplexing the power control signal with a transmission data to form a combined signal; and (d) modulating the combined signal and transmitting the modulated combined signal.

14. The transmission method as claimed in claim 13, wherein the step of the multiplexing is operated, by puncturing the transmission data at a particular position and inserting the power control signal at the punctured position.

15. The transmission method as claimed in claim 13, wherein the step of the multiplexing is operated by multiplexing the power control signal and the transmission data.

16. The transmission method as claimed in claim 15, wherein the PCB pattern corresponds to the user pattern.

17. The transmission method as claimed in claim 13, wherein the user patterns are orthogonal with one another.

18. The transmission method as claimed in claim 13, wherein the user patterns are assigned to the mobile stations by way of a prior negotiation.

19. A reception method for a mobile station, comprising the steps of:

(a) extracting a power control signal within a given interval of a reception signal received on a code channel, wherein the power control signal includes PCB patterns for a plurality of mobile stations;

(b) multiplying the power control signal by a user pattern assigned to the mobile station itself, to extract the PCB pattern of the mobile station; and (c) generating a PCB in accordance with a signal level of the extracted PCB pattern.

20. The reception method as claimed in claim 19, further comprising the step of multiplying the PCB pattern by a conjugate signal resulting from channel estimation to generate a distortion compensated PCB pattern.

21. The reception method as claimed in claim 19, wherein the PCB pattern corresponds to the user pattern.

22. The reception method as claimed in claim 19, wherein the user patterns are orthogonal with one another.

23. The reception method as claimed in claim 19, wherein the user patterns is assigned to the mobile stations in a prior negotiation.

\* \* \* \* \*